US010938005B2

(12) United States Patent
Koropachinsky et al.

(10) Patent No.: US 10,938,005 B2
(45) Date of Patent: Mar. 2, 2021

(54) SEAT ASSEMBLY OR BATTERY ASSEMBLY THAT CAN BE QUICKLY EXCHANGED, AND MOTOR VEHICLE, IN PARTICULAR MOTOR SCOOTER

(71) Applicant: UJET VEHICLES S. À R. L., Bertrange (LU)

(72) Inventors: Yuri Koropachinsky, Point Piper (AU); Patrick David, Blaustein (DE)

(73) Assignee: UJET S.A., Leudelange (LU)

( * ) Notice: Subject to any disclaimer, the term of this patent is extended or adjusted under 35 U.S.C. 154(b) by 323 days.

(21) Appl. No.: 16/091,669

(22) PCT Filed: Oct. 12, 2016

(86) PCT No.: PCT/EP2016/074480
§ 371 (c)(1),
(2) Date: Oct. 5, 2018

(87) PCT Pub. No.: WO2017/174163
PCT Pub. Date: Oct. 12, 2017

(65) Prior Publication Data
US 2019/0157641 A1    May 23, 2019

(30) Foreign Application Priority Data
Apr. 6, 2016    (WO) .................. PCT/EP2016/057500

(51) Int. Cl.
*H01M 2/10*    (2006.01)
*H01M 10/625*    (2014.01)
(Continued)

(52) U.S. Cl.
CPC ......... *H01M 2/1083* (2013.01); *B60L 3/0015* (2013.01); *B60L 50/64* (2019.02);
(Continued)

(58) Field of Classification Search
CPC .......... H01M 2/1083; H01M 10/6563; H01M 10/6556; H01M 10/6561; H01M 10/425;
(Continued)

(56) References Cited

U.S. PATENT DOCUMENTS 5,613,569 A * 3/1997 Sugioka .............. H01M 10/625
180/68.5
6,624,610 B1 * 9/2003 Ono ......................... B62J 11/00
320/104
(Continued)

FOREIGN PATENT DOCUMENTS

DE    10 2007 054 258 A1    5/2009
DE    10 2011 111 537 A1    2/2013
(Continued)

OTHER PUBLICATIONS

International Search Report and Written Opinion for Application No. PCT/EP2016/074480, dated Dec. 12, 2016.
(Continued)

*Primary Examiner* — Kevin Hurley
*Assistant Examiner* — Marlon A Arce
(74) *Attorney, Agent, or Firm* — Marshall, Gerstein & Borun LLP

(57) ABSTRACT

The assembly of motor scooters has not yet been sufficiently solved.
According to the invention, the object is achieved by a seat assembly (70), in particular a battery assembly (70), for a motor vehicle (10), comprising:
  a frame (21), in particular comprising a battery housing (21);
  a saddle (20) arranged on the frame (21) and detachably connected to the frame (21) by a securing element;
  a compartment (150, 150') having a drawer (152) arranged extendible within the compartment (150, 150'),
(Continued)

Figure 1:
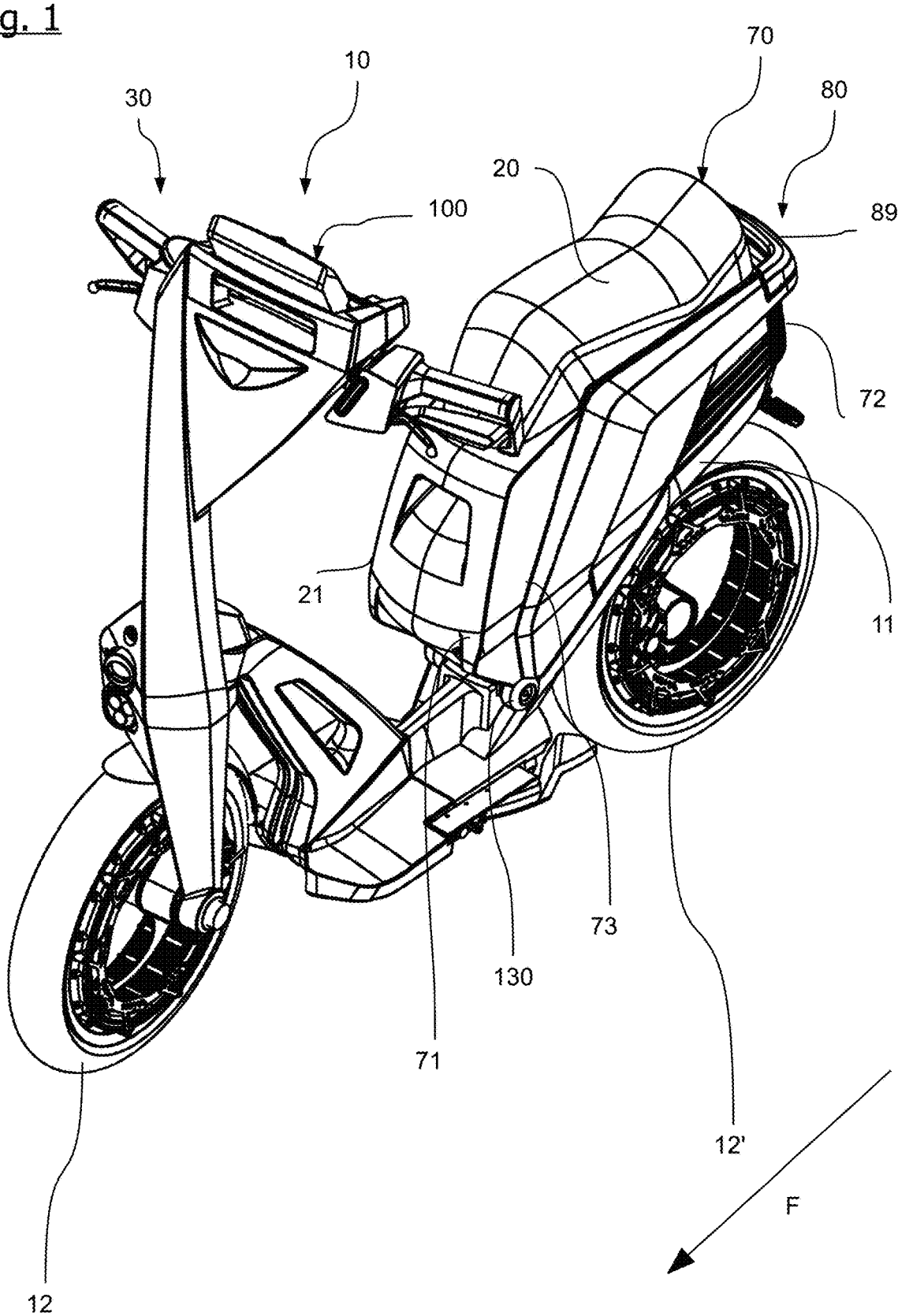

wherein:
the securing element is adapted to:
release the saddle (20) in a release position; and
secure the saddle (20) in an anchoring position,
wherein the securing element is arranged and adapted such that the securing element is actuated and/or released when the drawer (152) is pulled out.

20 Claims, 14 Drawing Sheets

(51) Int. Cl.
| | | |
|---|---|---|
| *H01M 10/613* | (2014.01) | |
| *B60L 50/60* | (2019.01) | |
| *B60L 50/64* | (2019.01) | |
| *B62K 19/36* | (2006.01) | |
| *H01M 10/6563* | (2014.01) | |
| *B62K 19/46* | (2006.01) | |
| *B62J 1/00* | (2006.01) | |
| *B60L 3/00* | (2019.01) | |
| *B62K 19/30* | (2006.01) | |
| *B60L 53/80* | (2019.01) | |
| *B60L 53/16* | (2019.01) | |
| *B60L 58/26* | (2019.01) | |
| *H01M 10/6556* | (2014.01) | |
| *H01M 10/6561* | (2014.01) | |
| *H01M 10/42* | (2006.01) | |
| *B62J 1/28* | (2006.01) | |
| *H01M 10/6551* | (2014.01) | |
| *B62J 43/00* | (2020.01) | |

(52) U.S. Cl.
CPC ............... *B60L 50/66* (2019.02); *B60L 53/16* (2019.02); *B60L 53/80* (2019.02); *B60L 58/26* (2019.02); *B62J 1/00* (2013.01); *B62J 1/28* (2013.01); *B62K 19/30* (2013.01); *B62K 19/36* (2013.01); *B62K 19/46* (2013.01); *H01M 10/425* (2013.01); *H01M 10/613* (2015.04); *H01M 10/625* (2015.04); *H01M 10/6556* (2015.04); *H01M 10/6561* (2015.04); *H01M 10/6563* (2015.04); *B60L 2200/12* (2013.01); *B60L 2200/24* (2013.01); *B62J 43/00* (2020.02); *B62K 2202/00* (2013.01); *B62K 2204/00* (2013.01); *B62K 2206/00* (2013.01); *H01M 10/6551* (2015.04); *H01M 2220/20* (2013.01); *Y02T 10/70* (2013.01); *Y02T 10/7072* (2013.01); *Y02T 90/12* (2013.01); *Y02T 90/14* (2013.01)

(58) Field of Classification Search
CPC ............. H01M 10/625; H01M 10/613; H01M 10/6551; H01M 2220/20; B62K 19/36; B62K 19/46; B62K 19/30; B62K 2206/00; B62K 2204/00; B62K 2202/00; B62J 1/00; B62J 1/28; B62J 43/00; B60L 3/0015; B60L 53/80; B60L 53/16; B60L 58/26; B60L 50/66; B60L 50/64; B60L 2200/24; B60L 2200/12; Y02T 10/70; Y02T 90/12; Y02T 10/7072; Y02T 90/14; Y02E 60/10
See application file for complete search history.

(56) References Cited

U.S. PATENT DOCUMENTS 9,193,410 B2 * 11/2015 Watanabe ................ B62J 11/00
2006/0180373 A1    8/2006 Hanagan

FOREIGN PATENT DOCUMENTS

| EP | 1 857 314 A2 | 11/2007 |
|---|---|---|
| EP | 2 280 436 A2 | 2/2011 |
| EP | 2 280 436 A3 | 4/2011 |
| FR | 1 248 870 A | 12/1960 |
| JP | 61-5283 U | 1/1986 |
| JP | 08-273648 A | 10/1996 |
| JP | 2000-351391 A | 12/2000 |

OTHER PUBLICATIONS

International Search Report and Written Opinion for Application No. PCT/EP2016/057500, dated Apr. 8, 2016.

* cited by examiner

SEAT ASSEMBLY OR BATTERY ASSEMBLY THAT CAN BE QUICKLY EXCHANGED, AND MOTOR VEHICLE, IN PARTICULAR MOTOR SCOOTER

The invention relates to a seat assembly according to claim 1 and a battery assembly, in particular for an electrically driven motor vehicle, in particular motorcycle, preferably motor scooter, according to claim 6. Furthermore, the invention relates to an electrically driven motor vehicle, in particular motorcycle, preferably motor scooter, comprising at least one battery assembly and/or seat assembly according to claim 16. Furthermore, the invention relates to a method for assembling a motor vehicle according to claim 20.

Motorcycles or motor scooters equipped with electric drives are known. As an example, reference is made to EP 1 857 314 A2. Corresponding electrically driven motorcycles or motor scooters usually have a body and at least two wheels, wherein one of the wheels is driven by an electric drive powered by a battery. Charging a battery takes considerably longer than refueling motor vehicles powered by an internal combustion engine. In this respect, a rechargeable battery should be charged if possible when the electric motor vehicle is not required for the foreseeable future. The motor vehicle/motor scooter cannot be used during this battery charge time.

It is also necessary for motorcycles or motor scooters that the seat height is adjusted to the size of the motorcyclist to ensure safe use of the motor scooter. Usually, motor scooters are delivered to the end customer with a saddle whose height can no longer be changed. When changing motorcyclists, however, it is necessary that the saddle can still be changed after delivery in order to be able to adjust the height of the padding to the motorcyclist.

Based on this prior art, it is the object of the present invention to provide a seat assembly that addresses the disadvantages mentioned above. In particular, a seat assembly is to be specified that ensures a secure hold of the saddle while driving and can be individually adapted to the motorcyclist. Furthermore, the saddle should be protected against access by unauthorized persons. In addition, a method for assembling a motor vehicle is to be specified. Furthermore, it is the object of the invention to provide a battery assembly which can be removed from a motor vehicle, e.g. a motor scooter, as easily and without great effort as possible, so that the motor vehicle/motor scooter can be equipped with a fully charged battery or a fully charged battery assembly. Furthermore, it is the object of the present invention to provide a further developed motor vehicle, preferably a further developed motor scooter, which is designed in such a way that it can be easily fitted with replaceable battery assemblies.

The object is achieved by a seat assembly for a motor vehicle according to claim 1.

In particular, the object is achieved by a seat assembly, in particular a battery assembly, comprising:
a frame, in particular comprising a battery housing;
a saddle mounted on the frame and detachably connected to the frame by a securing element;
a compartment having a drawer arranged extendible within the compartment,
wherein:
the securing element is adapted to:
  release the saddle in a release position; and
  secure the saddle in an anchoring position,
wherein the securing element is arranged and adapted such that the securing element is actuated and/or released when the drawer is pulled out.

The saddle of the provided seat assembly is arranged on the frame. The frame can be any supporting structure. It is also conceivable that the frame is arranged within a housing, that the frame represents the housing itself, that the frame is arranged around a housing or that the frame is integrated in a housing or that the housing is part of the frame.

With the provided seat assembly it is therefore possible that a saddle can be easily released when the securing element is actuated. This can be achieved either by pulling the drawer out of the compartment or by manually actuating the securing element, for example. It is also possible that the securing element is released or accessible in the anchoring position. In any case, the saddle can be easily removed and thus replaced.

In one embodiment, the securing element can comprise a pin and a groove or an eyelet, wherein the groove or eyelet can be firmly connected to the saddle and the pin can be firmly connected to the drawer, wherein the pin can engage in the groove or eyelet in an inserted position of the drawer such that the saddle is secured against theft.

A particularly efficient way of securing the saddle is to use a pin that engages in a groove to secure the saddle. For example, the pin can be fixed in this case to the drawer and the groove can be provided on the saddle. The pin can engage in this case in the groove in the anchoring position in such a way that the saddle cannot be released. When the drawer is pulled out, the pin is pulled out of the groove so that the saddle can be easily removed.

In one embodiment, the securing element can be designed as a snap lock.

With this embodiment it is also possible that the saddle is connected to the frame via a snap lock in such a way that the saddle engages with the frame in the anchoring position.

Thus, another possibility is provided as to how the saddle can be secured with the frame. The advantage of using a snap lock is that the user gets a haptic feedback when the saddle is locked to the frame.

In one embodiment, the seat assembly may have a spring element, wherein the spring element may be arranged and designed such that the saddle is pretensioned against the frame by means of the spring element when the saddle is secured.

The advantage of pretensioning the saddle relative to the frame is that the saddle is pushed away from the frame when the securing element is actuated. This makes it easier for the motorcyclist to release the saddle with the frame. This gives the motorcyclist immediate visual feedback as to whether the saddle is connected to the frame.

In one embodiment, the saddle can have a recess and the drawer can have a locking cylinder with a locking nose, wherein the locking nose can be designed to engage in the recess in a locking position of the locking cylinder when the drawer is in the inserted position.

The embodiment described above makes it possible to secure the drawer against opening by unauthorized persons. For example, a combination lock or a lock with key can be used in this case. Electronic locks are also conceivable.

The above object is also achieved by a battery assembly according to claim 6. In particular, the object is achieved by a battery assembly for an electrically drivable motor vehicle, in particular for a motorcycle, preferably for an electric motor scooter. The battery assembly includes:
at least one battery, in particular a rechargeable battery;

at least one releasable mechanical lock for connecting the battery housing to a unit to be supplied with electrical energy, in particular for connecting the battery assembly to the motor vehicle;

a drawer arranged in a compartment, wherein the mechanical lock can be actuated by a locking actuating element located in the drawer.

With the above solution, the interlock between the battery assembly and the motor vehicle can be released. It is advantageous that the locking actuation element is arranged in a drawer so that it cannot be operated inadvertently.

The drawer can be designed in one embodiment as lockable and/or closeable.

This provides a safety mechanism that prevents unauthorized persons from removing the battery assembly.

It is possible in one embodiment that the battery assembly can be actuated, in particular pulled or pushed, with an extendable and/or fold-out and/or swing-out actuating element.

The actuating element can be designed as a lever or handle, in particular as a bow handle. The handle preferably has a gripping section that can be gripped in particular with the complete hand. The gripping section preferably merges into at least one, preferably two, extension section(s). The at least one extension section can be a rod-like or rail-like element. This rod-like or rail-like element is mounted in particular in or on the battery housing in a fold-out and/or swing-out and/or pull-out manner, in particular telescopically.

In a first state of use, which corresponds to the driving condition of a motor vehicle, in particular an electric motor scooter, the extension section may preferably be stored completely in the battery housing. In a further state of use corresponding to the state of the battery assembly detached from the motor vehicle, in particular from the motor scooter, the at least one extension section may be folded out and/or swiveled out and/or pulled out of the housing so that the actuating element is in an at least partially folded out and/or swiveled out and/or pulled out, in particular partially telescoped, state. This is comparable to the extended handle of a suitcase or trolley. A folded out and/or swiveled out and/or extendable, in particular telescopic, actuating element thus facilitates the handling of a battery assembly detached from a motor scooter. The battery assembly can be pulled to a charging station, for example, with the aid of the actuating element. In a particularly preferred exemplary embodiment, the actuating element is designed as a bow handle.

The battery housing may comprise a front section, a rear section, two side sections connecting the front and rear sections, a cover section and a bottom section, wherein the battery housing preferably has a guide device, in particular a slider-type guide device, which can be pushed or is slidable onto a guide device of the motor vehicle, in particular a rail-type guide device, preferably of a motor scooter.

At least two rollers are arranged in a particularly preferred manner on the battery housing. These are preferably formed at the front section or at the transition section from the front section to the bottom section of the battery housing. With the help of at least two rollers, the battery assembly can be pulled particularly evenly. The rollers can be part of this function and/or perform this function. The rollers can thus facilitate the arrangement of the battery group on the motor vehicle and be guided during arrangement in the guide device of the motor vehicle.

The front, back, side and cover sections can be designed in a flat or curved manner. In particular, at least individual connection or transition areas between the individual housing sections or sections of the battery housing can be formed in a bevelled and/or curved manner.

The guide device of the motor vehicle, in particular of the rail type, forms the counterpart to the guide device of the battery housing, in particular the slide type. The slider-like guide device of the battery housing is especially designed in the bottom section of the battery housing.

It is possible that the battery housing of the battery assembly can be moved on the rail-like guide device of a motor scooter, especially in the direction of travel or against the direction of travel.

The guide device of the battery housing, in particular its slider-like design, preferably merges into a locking plate or plates. The locking plate(s) is/are preferably guided or pushed or rolled on the guide device of the unit to be supplied, which is designed in particular in a rail-like manner.

The motor vehicle, especially the motor scooter, preferably has a centring aid. For example, the centring aid can be in the form of a triangular and/or U-shaped and/or V-shaped shape so that the locking plate or plates is/are guided along this shaped part in order to be guided into at least one locking recess. The rollers can facilitate the mounting process. The term "shaped part" refers to an element that protrudes or stands out from a base surface. Edges of the at least one locking plate extend along the edges of the centring aid when the battery assembly is pushed onto the motor scooter.

In a further embodiment of the invention, the battery housing has an engagement recess in the area of the actuating element, in particular in the rear section, which is designed in such a way that the actuating element can be gripped with one hand. In the state of the battery assembly connected to the motor vehicle, the gripping section of the actuating element extends preferably transversely to the direction of travel. The battery housing has such a recess or engagement recess that the actuating element can be pulled in a clamping grip, in particular pulled up.

The battery assembly can have passive cooling and/or active cooling to increase the efficiency of the battery in the battery housing. Passive cooling can be an arrangement of cooling ribs, for example. For example, the cooling rib arrangement is formed on the rear section and/or on one or more side sections of the battery housing.

Passive cooling can also concern at least one air inlet opening. While riding a motor scooter, ambient air can be passed through the at least one air inlet opening into the battery housing through an appropriately designed air inlet opening, wherein the heated air can flow out of the battery housing through at least one corresponding air outlet opening. It is possible that at least one ventilation wheel is located in the battery housing as active cooling. Active water cooling can also be provided inside the battery housing. As an arrangement of cooling ribs, so-called cooling rib plates can be used.

The battery assembly may also include at least one power plug. The battery assembly is electrically connected to the motor vehicle, especially to the electric motor scooter, by means of a power plug.

Preferably, the battery assembly has a combined current/communication plug. With the help of such a plug, the motor vehicle can be supplied with current or receive current from the motor vehicle. Furthermore, such a combined current/communication plug can be used to establish a communication transmission or communication link between the battery assembly and the motor vehicle. The combined current/communication connector preferably has a bus interface.

The combined current/communication plug is formed, for example, on a side section of the battery housing. The pins of the current/communication plug are preferably designed perpendicular to a bottom surface. The current/communication plug can therefore be connected to a current/communication socket of a motor vehicle, in particular an electric motor scooter, by pushing the plug onto the socket.

The combined current/communication plug can be disconnected from a combined current/communication socket of the motor vehicle, for example, by lifting or pulling up the slider-like guide device of the battery housing along the rail-like guide device of the motor vehicle. Preferably, no current is present when the current/communication plug is disconnected from the current/communication socket. Before removing the battery assembly from a motor vehicle, the circuit between the motor vehicle and the battery assembly is preferably interrupted. Preferably, upon disconnecting the combined current/communication plug from the combined current/communication socket, no current is applied to the combined current/communication connection formed by the combined current/communication plug and combined current/communication socket.

Preferably, the battery assembly is mechanically locked in the bottom section of the battery housing. The mechanical lock can be designed as a locking hook, for example.

The locking actuator can be a cord or chain or a strap or loop, for example. The mechanical lock, in particular the locking hook, can be operated by pulling on the cord or chain or on the strap or on the loop.

In one embodiment, a drawer can be arranged in the compartment and the locking actuating element can be arranged and designed in such a way that the locking actuating element is accessible or actuable when the drawer is extended.

When the locking actuating element is arranged inside a drawer located inside the compartment, access to the locking actuating element is facilitated. The motorcyclist only has to pull out the drawer to gain access to the locking actuating element. In one embodiment it is also possible that the drawer can be locked with a lock. Providing a lock makes it impossible or more difficult for unauthorised persons to access the locking actuation element.

At least one roller can be arranged on the battery housing, in particular on the front section side, so that the battery assembly can be rolled when separated from the motor vehicle with the aid of the actuating element. It is possible that the at least one roller is designed to be retractable within the battery housing. The operating element serves as a handle when rolling. The battery assembly is preferably designed so that it can be pulled in a trolley-like manner.

The battery assembly can also have at least one mains socket for charging the at least one battery. A mains socket is used to charge the at least one battery or to charge at least one battery pack. A current plug can be inserted into the at least one mains socket so that the at least one battery pack can be charged.

It is possible that several battery packs or battery packs are arranged in the battery housing. Preferably, at least two mains sockets are formed. This enables faster charging of multiple battery packs.

Furthermore, the battery module can include at least one Bluetooth interface and/or at least one USB socket. It is possible that the at least one mains socket and/or the at least one Bluetooth interface and/or the at least one USB socket is/are designed within the preferably closable and/or lockable drawer. This enables tamper protection so that only the owner of a key or access system to the drawer can access a USB socket and/or a mains socket and can switch the at least one Bluetooth interface on or off.

Programs can be loaded with the help of a USB socket. It is also possible to read out a fault memory using a USB socket. Furthermore, a Bluetooth interface and/or a USB socket can be used to control a loudspeaker arranged within the battery module, in particular within the battery housing. It is possible to send audio files to the battery module via the Bluetooth interface and/or the USB socket.

At least one loudspeaker can be installed in the battery housing. The loudspeaker is preferably a resonant loudspeaker. Advantageously, a section of the battery housing can be designed as a resonance surface.

In a further embodiment of the invention, a saddle can be formed on the battery housing, in particular on the cover-section side. A saddle of a motor scooter is therefore designed as an element of the battery assembly. The saddle is preferably connected to the battery housing, in particular the cover section of the battery housing, in particular glued thereto and/or latched thereon. The saddle may be formed of a foam material.

Preferably, the saddle has an ergonomically advantageous shape. For example, the saddle has an (essentially) V-shaped and/or U-shaped cross-section profile. The cross-sectional profile is visible as a longitudinal section running in the direction of travel. At least in sections, the saddle can have the form of an (essentially) hyperbolic paraboloid.

Furthermore, the battery assembly may include a DC-DC converter, i.e. a direct-current-to-direct-current converter, and/or a battery charger and/or battery control unit. In addition, the battery assembly can have an emergency stop button. For example, the battery module can provide a 48V/12V voltage supply. It is possible that the 48V voltage supply is provided directly by the at least one battery pack. The 12 V power supply can be realized, for example, with the help of the DC-DC converter.

The battery pack can be charged via an integrated battery charger, wherein the integrated battery charger can be supplied with power via at least one mains socket.

Due to the communication connection that can be established using the combined current/communication connector, it is possible that data regarding the battery, such as the temperature of the battery and/or the state of charge of the battery, can be transmitted to a control system of the motor vehicle and/or to a display unit of the motor vehicle.

A secondary aspect of the invention relates to an electrically driven motor vehicle according to claim 16. In particular, the invention relates to a motor vehicle, in particular an electrically driven motorcycle, in particular an electric motor scooter, comprising at least one replaceable battery assembly, in particular a battery assembly according to the invention or a seat assembly according to the invention. The battery assembly or seat assembly is preferably detachably fixed or anchored to a rear frame part of the motor vehicle, in particular the motor scooter. When installed, one or the front section of the battery housing or frame faces in the direction of travel or in the direction of the front wheel of the motor vehicle, in particular the electric motor scooter. One/the rear section of the battery housing or the frame preferably faces accordingly against the direction of travel or in the direction of the rear wheel.

The motor vehicle, in particular the motor scooter, may also have a guide device, in particular one formed in a rail-like manner, wherein the battery housing or the seat assembly, after releasing one/the mechanical lock of the battery assembly or the seat assembly, is slidable with the aid of one/the preferably slide-like guide device of the battery assembly or seat assembly from the guide device of the motorcycle, in particular the motor scooter, against the direction of travel. When the mechanical lock is released, a/the locking hook is released from the locking counterpart of the motor vehicle, in particular the motor scooter. Then the battery assembly or the seat assembly, in particular the battery housing or the frame of the seat assembly, can be pushed off the frame of the motor vehicle, in particular the motor scooter.

The motor vehicle, in particular the electric motor scooter, preferably comprises a locking counterpart designed to cooperate with the mechanical lock. The locking counterpart is preferably a locking bolt or a locking receptacle for a locking hook.

The object is also achieved by a method according to claim 20.

In particular, the object is achieved by a method of mounting a saddle, in particular the saddle of a seat assembly as described above and/or a saddle of a battery assembly as described above and/or an electrically drivable motor vehicle as also described above, wherein a securing element releasably connects a saddle in a securing position to a frame, in particular comprising a battery housing, comprising:

Transfer of the securing element from an anchoring position to a release position to release a first saddle;

Loosening of the saddle;

Inserting a second saddle, in particular a second saddle different from the first saddle, in particular a saddle with different seat height;

Transfer of the securing element from the release position to the anchoring position to secure the second saddle.

By means of the indicated method, it is made possible that a motorcyclist can mount the saddle in an easy way.

Advantageous and expedient designs of the battery assembly, seat assembly or motor vehicle according to the invention, in particular the electric motor scooter and the method according to the invention, are indicated in the subclaims.

Within the scope of this patent application, a seat assembly may also be a battery assembly. For example, a battery can also be provided for a seat assembly. In particular, the embodiments and exemplary embodiments of the battery assembly or the seat assembly can be combined with those of the seat assembly or battery assembly as desired.

Figure 2:
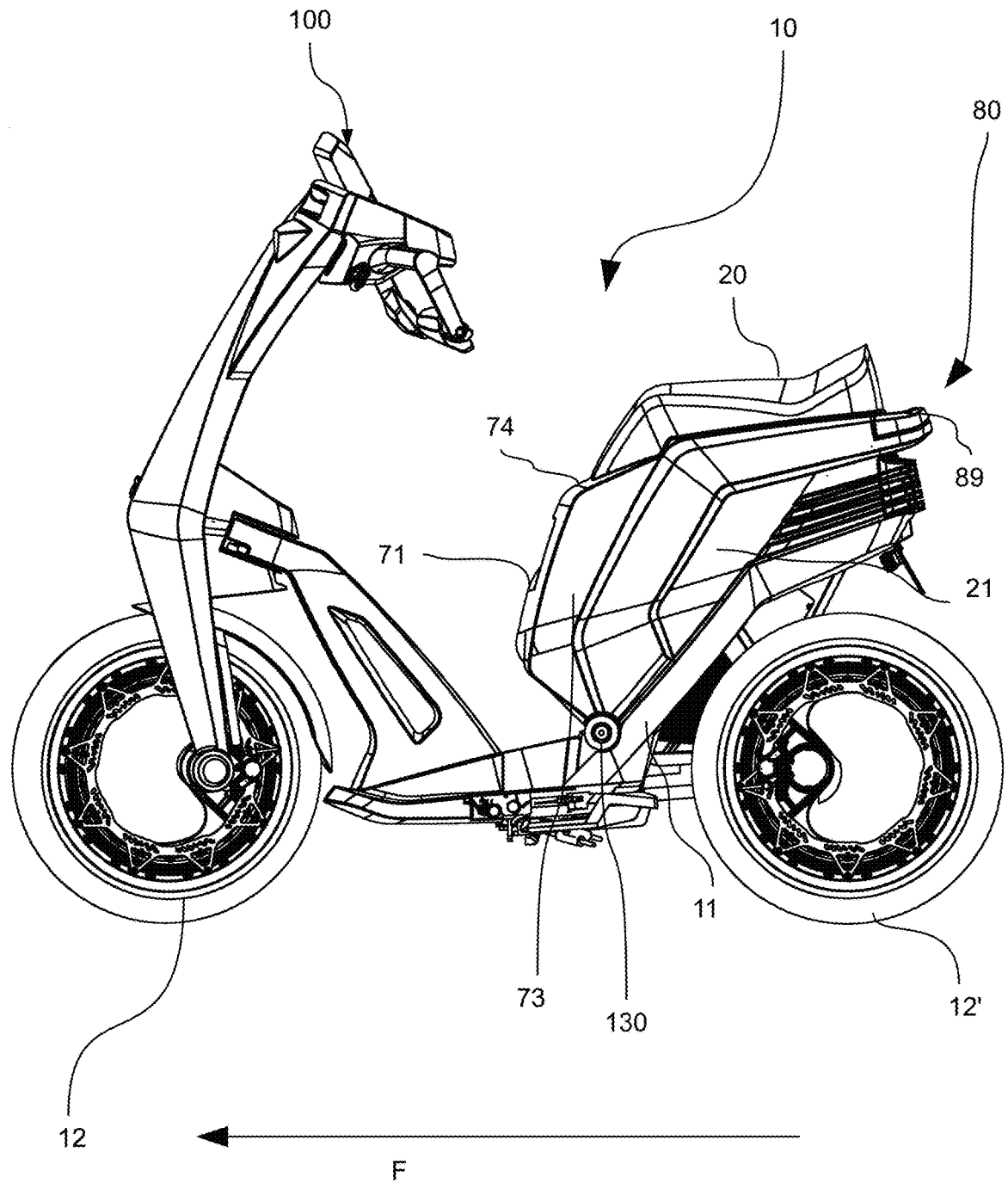
Figure 3:
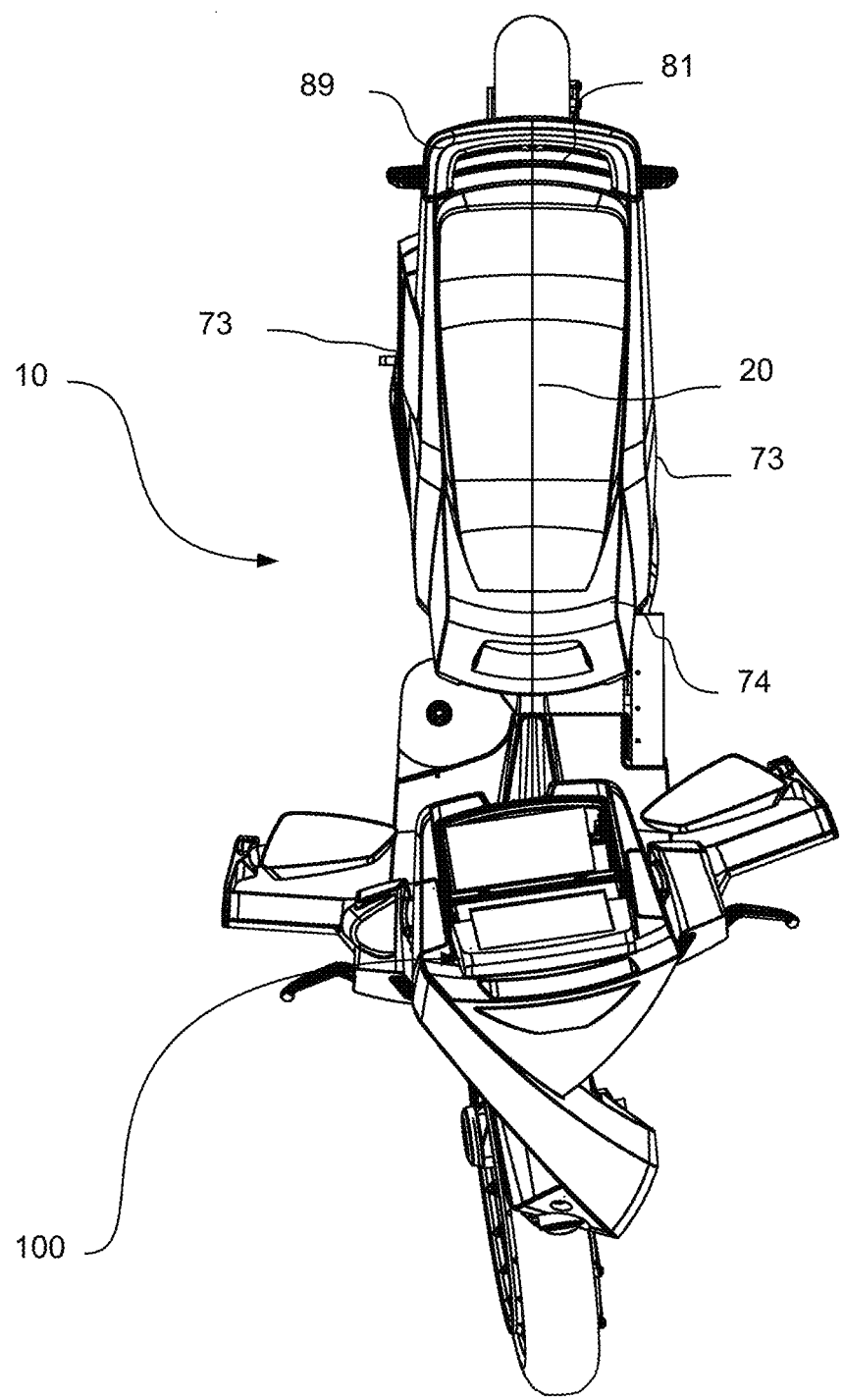
Figure 4A:
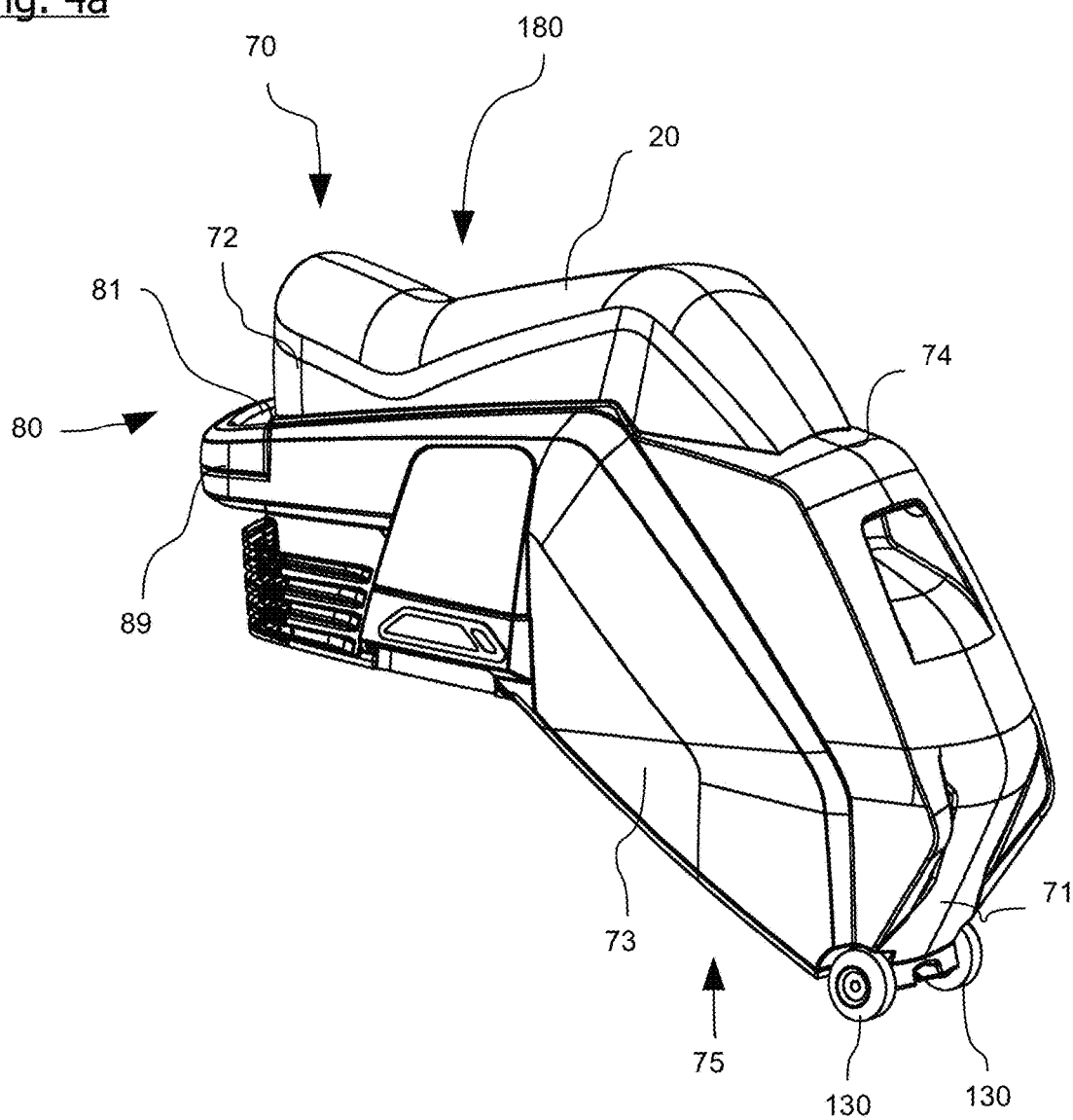
Figure 4B:
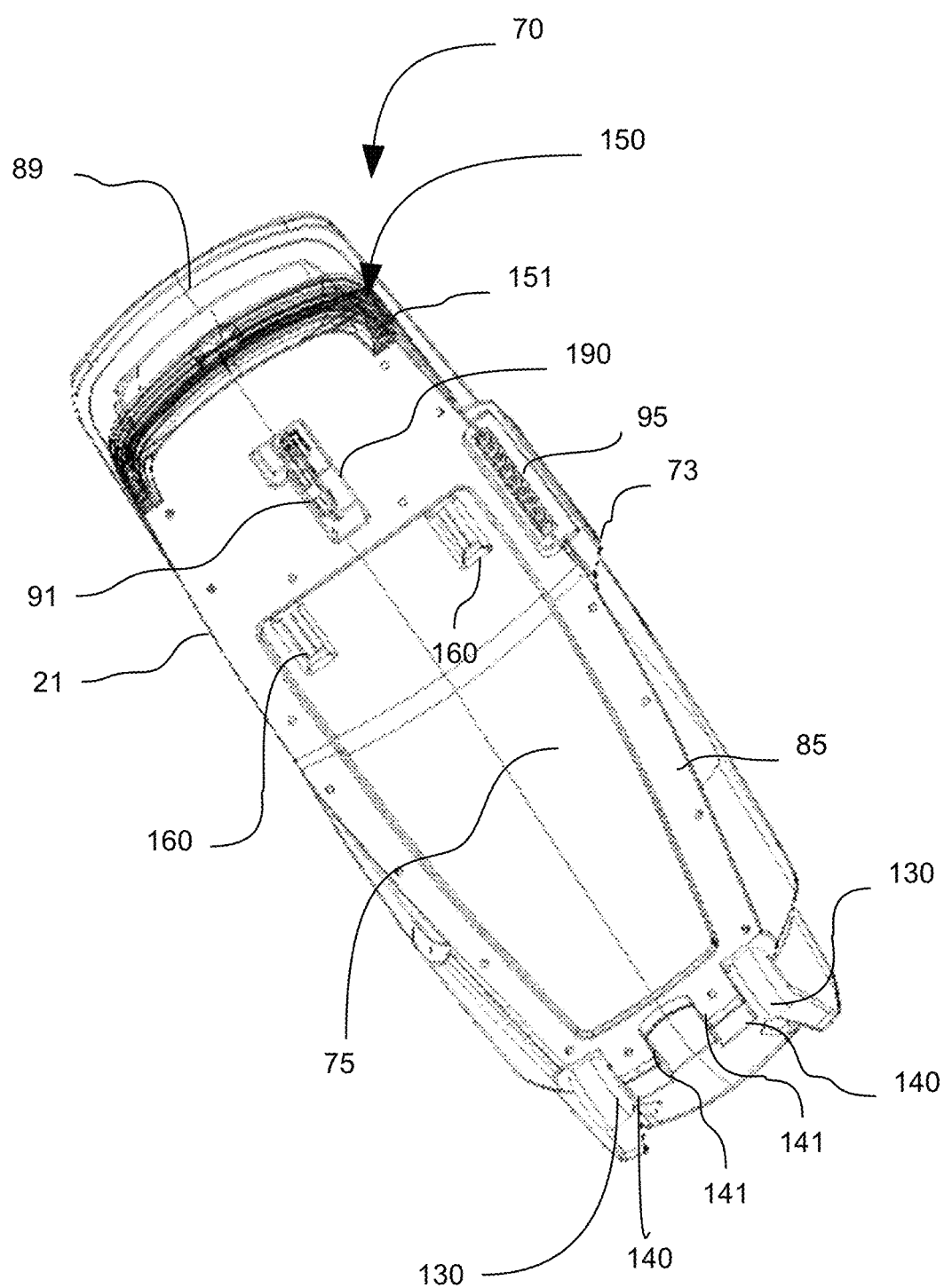
Figure 4C:
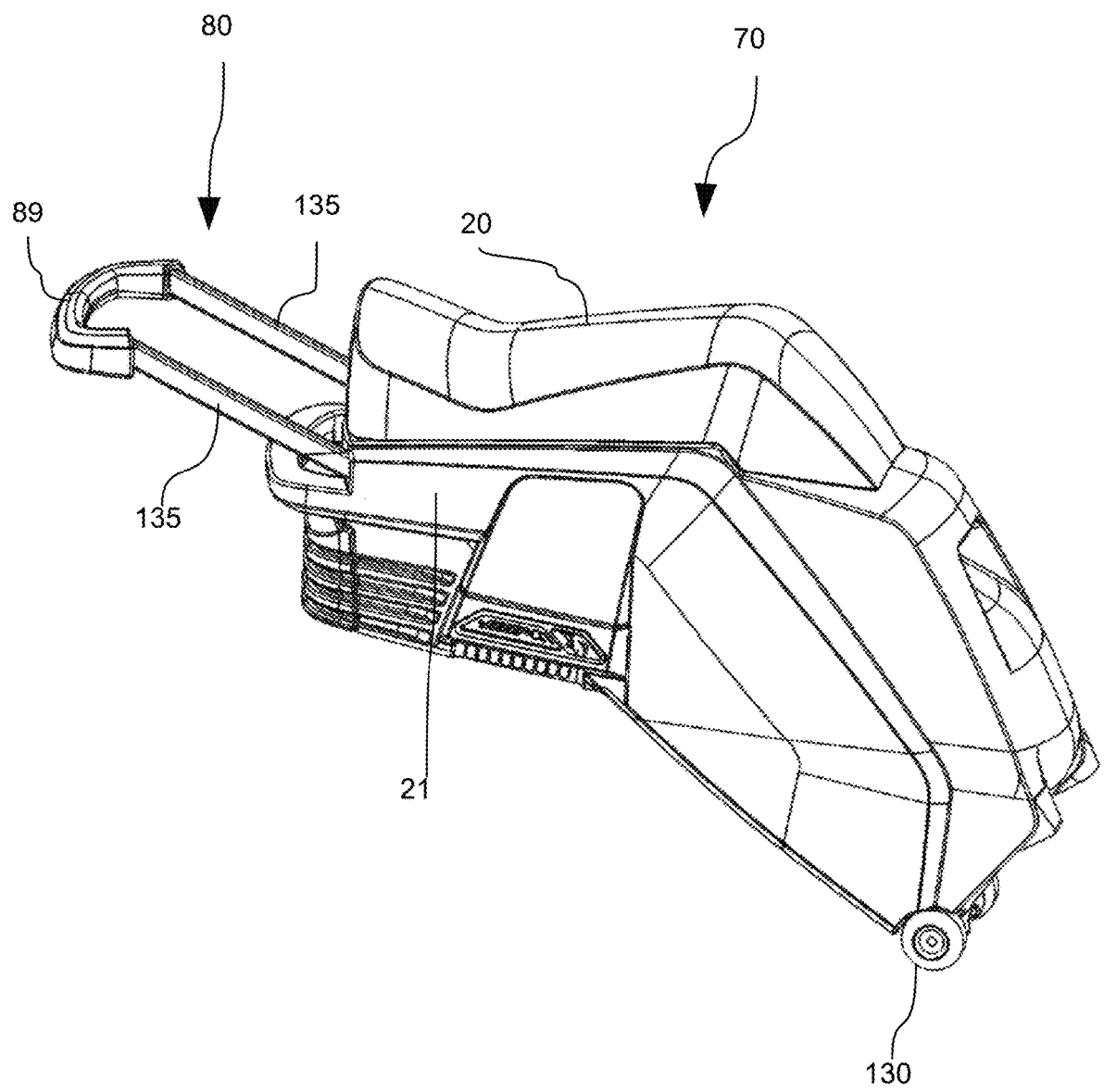
Figure 5:
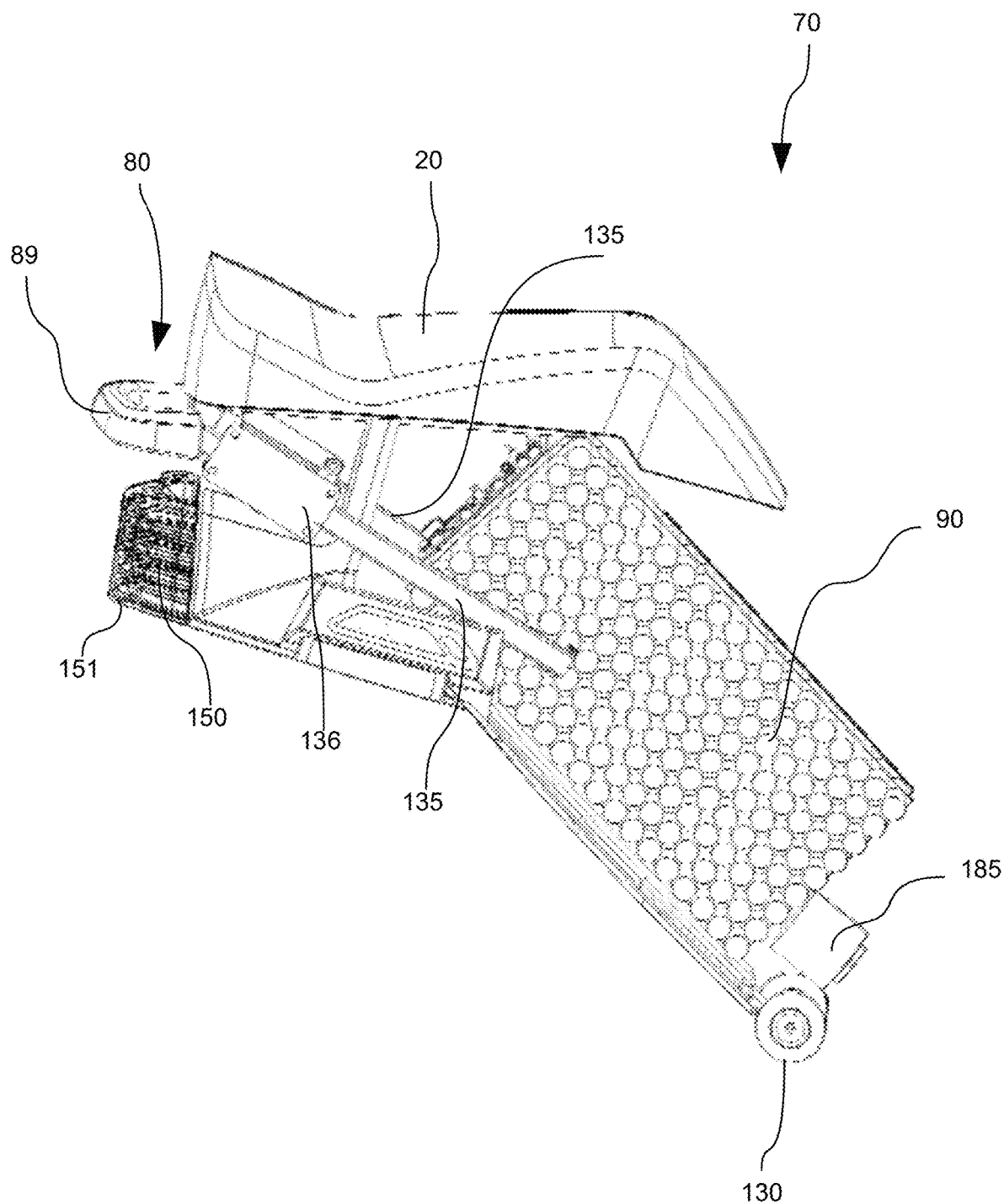
Figure 6:
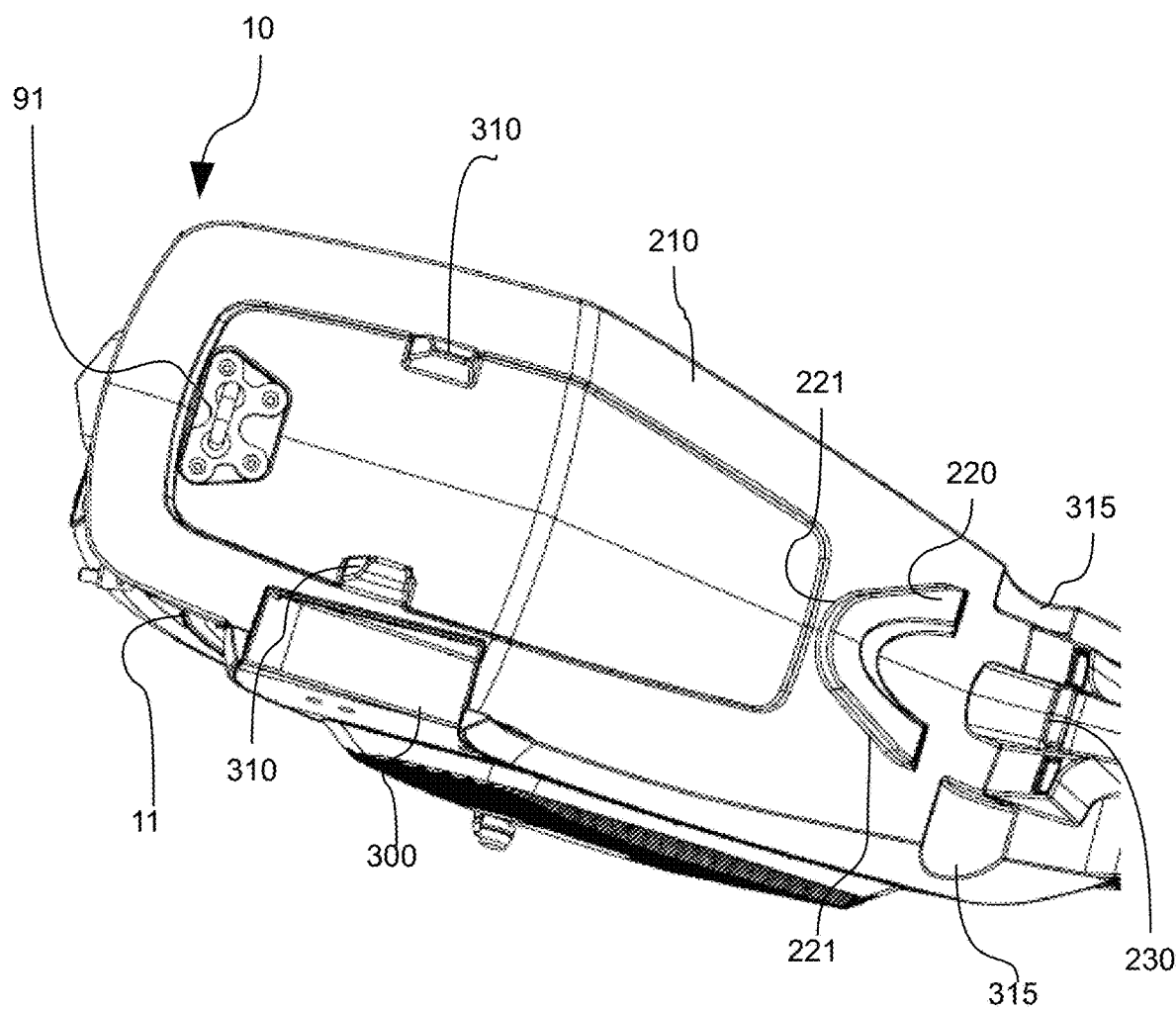
Figure 7:
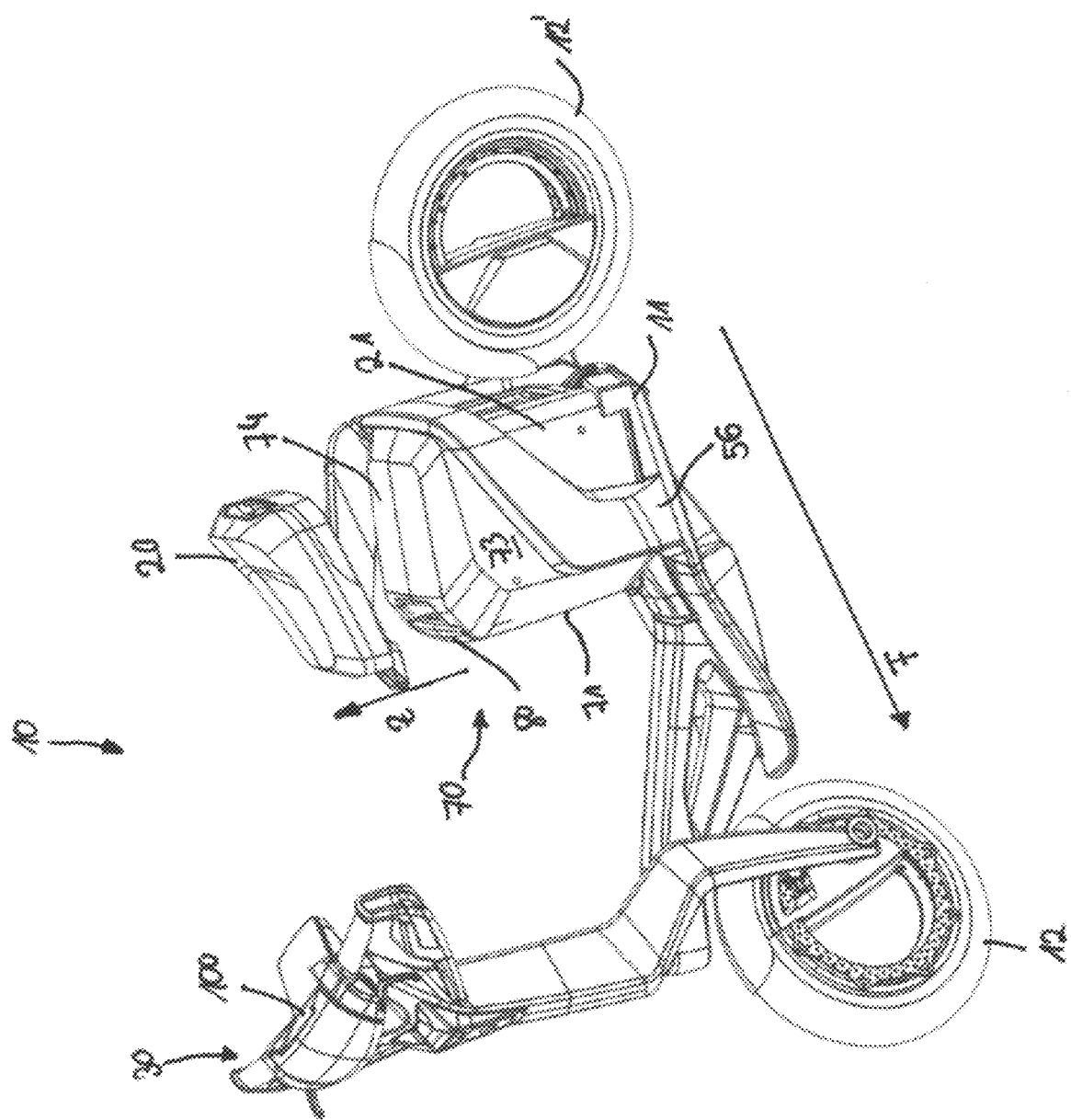
Figure 8A:
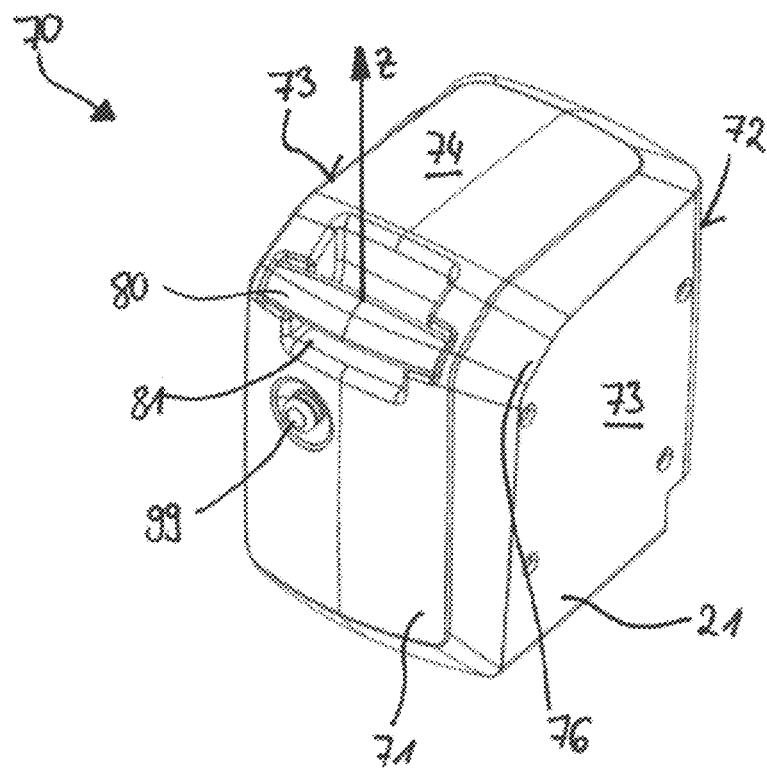
Figure 8B:
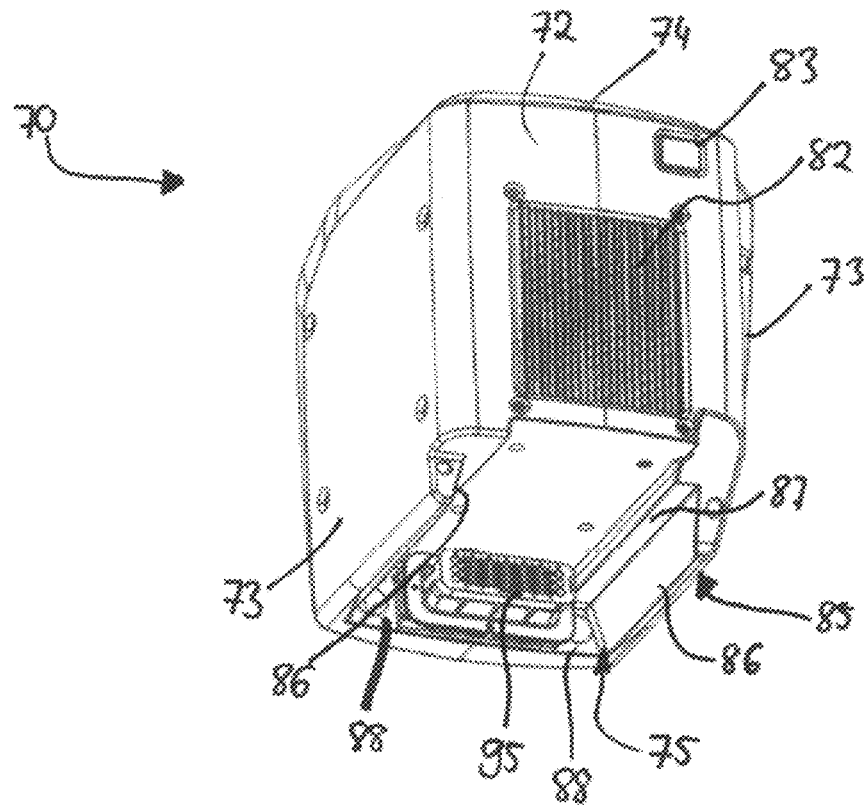
Figure 8C:
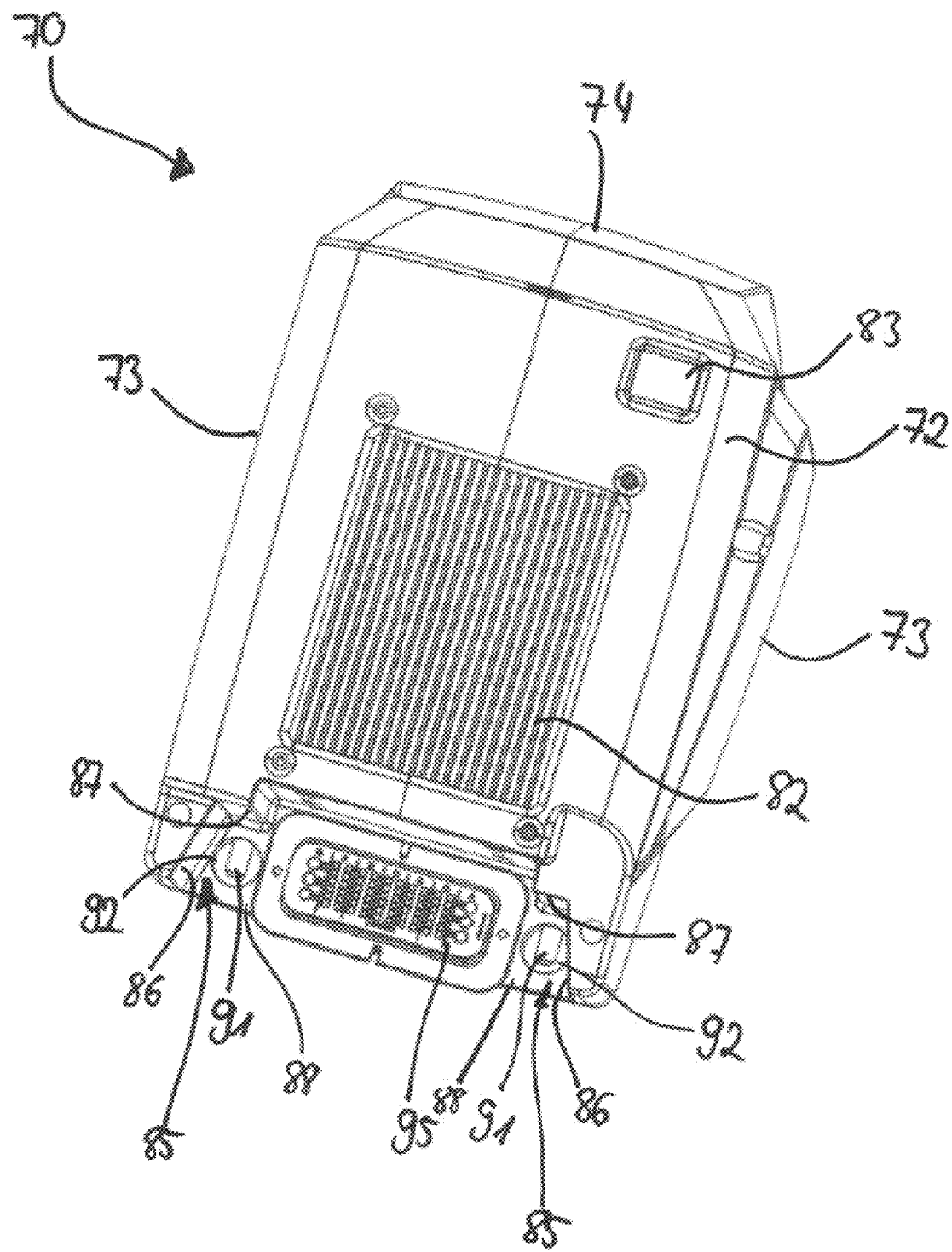
Figure 9:
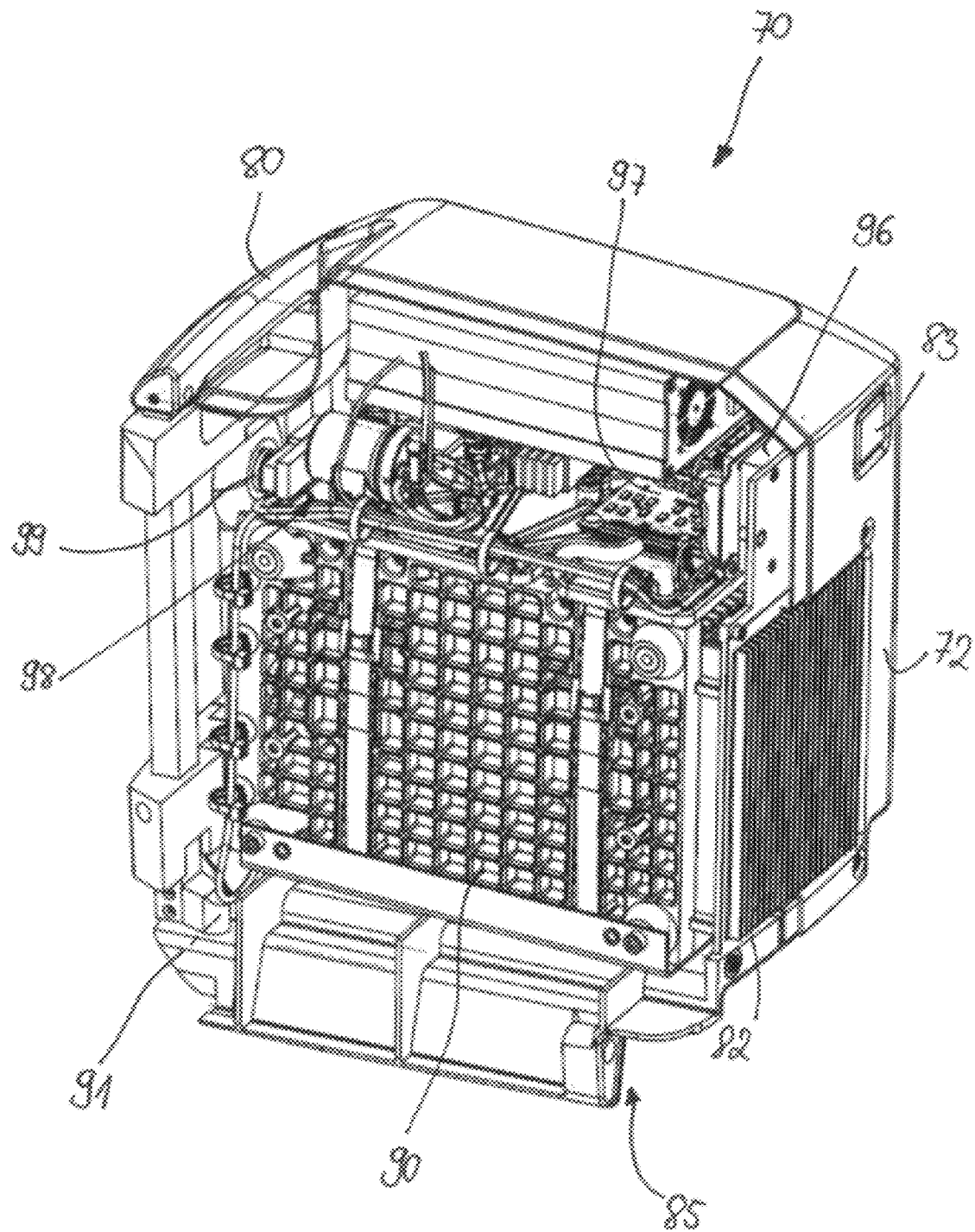
Figure 10:
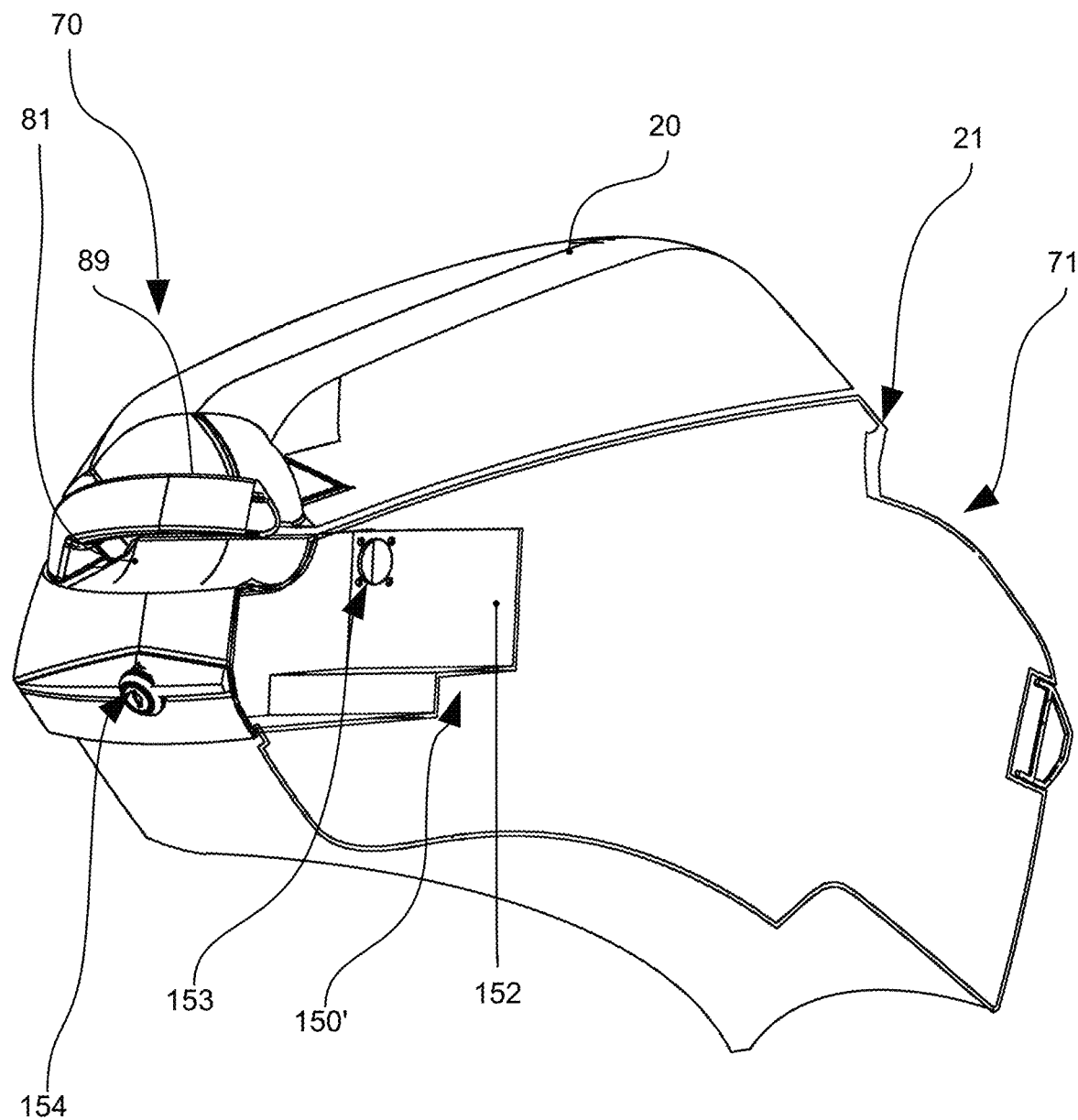
Figure 11:
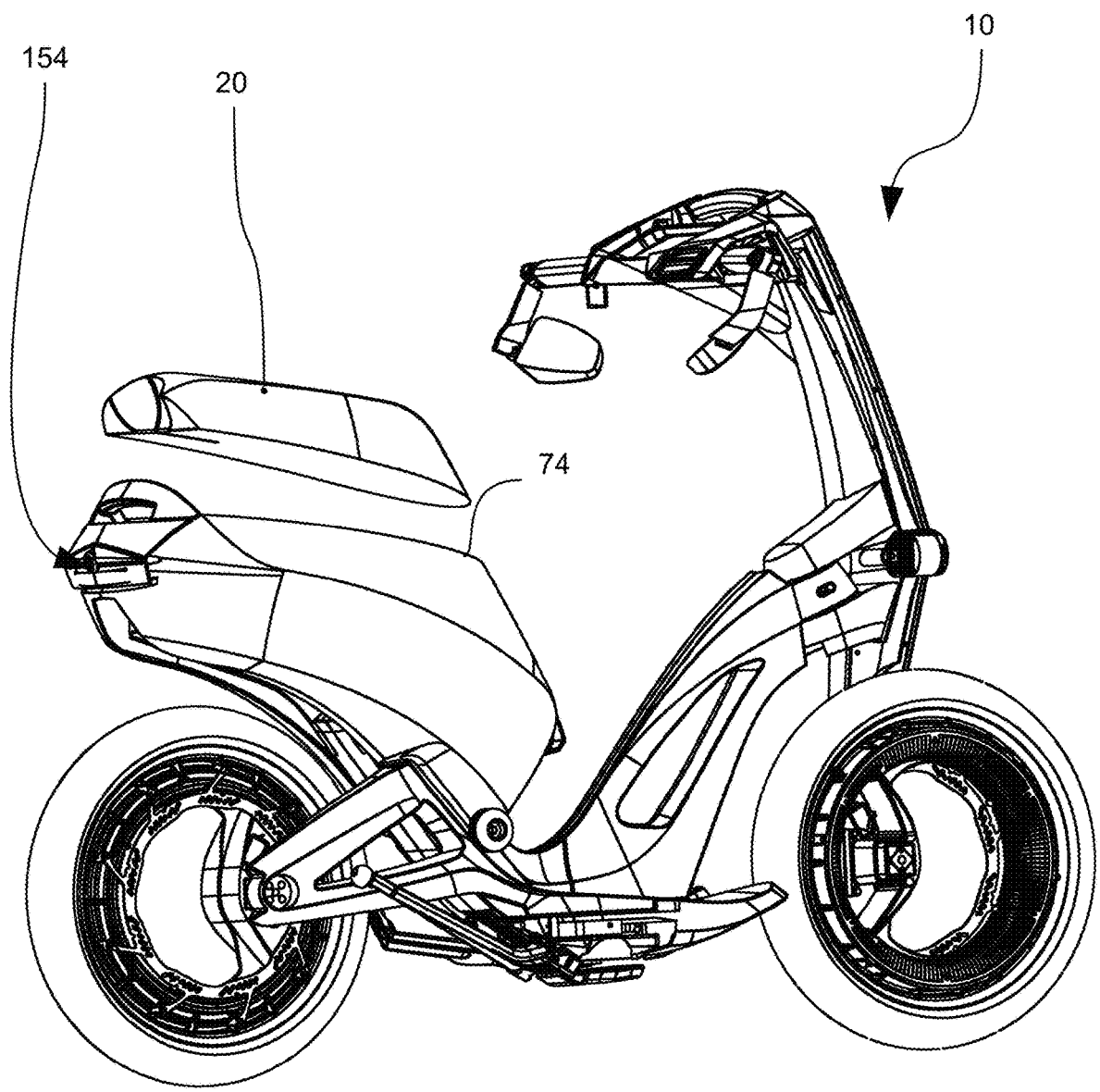

The invention is described below using exemplary embodiments for an electrically driven motor scooter, which are explained in more detail using illustrations, wherein:

FIG. 1: shows an electrically driven motor scooter in perspective view;

FIG. 2: shows the electrically driven motor scooter of FIG. 1 in a side view;

FIG. 3: shows the electrically driven motor scooter of FIGS. 1 and 2 in a plan view;

FIGS. 4a-4c: show different perspective views with regard to a battery assembly according to the invention, in accordance with a first embodiment;

FIG. 5: shows a transparent view with regard to the components located in the battery housing of the battery assembly;

FIG. 6: shows a rear frame part without fixed battery assembly;

FIG. 7: shows a motor scooter with a built-in battery assembly according to a second exemplary embodiment;

FIGS. 8a-8c: show different perspective views of a battery assembly according to the invention in accordance with a second embodiment;

FIG. 9: shows a transparent view of the components located in the battery housing of the battery assembly;

FIG. 10a: shows a section of a battery assembly with drawer in a perspective view; and FIG. 11: shows a perspective view of a motor scooter with the saddle removed.

In the following description, the same reference numbers are used for identical and equal-acting parts.

FIG. 1 shows an overall view of a motor scooter or electric motor scooter 10 according to the invention. The motor scooter 10 has a body on which a front wheel 12 and a rear wheel 12' are rotatably mounted. Furthermore, the body comprises a steering device 30, which enables the motor scooter 10 to be steered. The front wheel 12 is located at the lower end of the steering device 30. In the rear part, in particular on the rear frame part 11, there is a battery assembly or seat assembly 70 as well as a battery housing or frame 21 associated with the battery assembly 70. A saddle 20 can also be seen.

The battery assembly 70 or seat assembly comprises a battery housing 21 or frame with a front section 71, a rear section 72, two side sections 73 connecting the front and rear sections 71 and 72 and a bottom section 75 (see FIG. 4b). Also visible is an actuating element 80, which is in the form of a bow-type handle. When installed in the motor scooter 10, the gripping section 89 is arranged transversely to the direction of travel F.

In order to allow the actuating element 80, in particular the gripping section 89, to be gripped around, the battery housing 21 has an engagement recess 81 in the area of the rear section 72. This engagement recess 81 is designed in such a way that the actuating element 80, in particular the gripping section 89, can be completely gripped by hand.

FIGS. 4a to 4c show the battery assembly or seat assembly 70. The battery housing 21 comprises a front section 71, a rear section 72, two side sections 73 connecting the front and rear sections 71 and 72, a cover section 74 and a bottom section 75 (see FIG. 4b). Also visible is an actuating element 80, which is in the form of a bow-type handle. When installed in the motor scooter 10, the gripping section 89 is arranged transversely to the direction of travel F.

In order to allow gripping of the gripping section 89, the battery housing 21 has an engagement recess 81 in the region of the actuating element 80, namely in the rear section 72. This engagement recess 81 is designed such that the gripping section 89 can be completely gripped by hand.

Battery assembly 70 has two rollers 130. These rollers 130 are preferably designed at the front section 71 or at the transition section from the front section 71 to the bottom section 75 and to the side sections 73 of the battery housing 21. The battery assembly 70 can be pulled particularly evenly with the aid of at least two rollers 130.

The saddle 20 is designed as an element of battery assembly 70. In the illustrated exemplary embodiment, the saddle 20 is connected to the battery housing 21, in particular the cover section 74 of battery housing 21, in particular glued thereon and/or latched thereto. The saddle 20 is preferably made of a foam material. In an exemplary embodiment, the saddle is detachable so that the saddle 20 can be assembled (see also FIGS. 10 and 11).

The illustrated saddle 20 has an ergonomically advantageous shape. At least sections of a V-shaped cross-sectional profile 180 can be seen. The cross-sectional profile 180 is preferably visible as a longitudinal section extending in the direction of travel F. Saddle 20 can have the form of a hyperbolic paraboloid at least in sections. A cross-sectional profile is also formed transversely to the direction of travel F or parallel to the gripping section 89, wherein this cross-sectional profile is U-shaped at least in sections. Different saddles 20 are characterized among other things by the seat height. It is thus possible, for example, to exchange a saddle 20 with a high seat height by a saddle 20 with a low seat height. By selecting saddle 20, the seat height can be optimally adjusted to the motorcyclist.

The bottom section 75 is shown in FIG. 4b. A depression 190 is formed in the bottom section 75, wherein a mechanical lock 91 is formed in this depression 190 or recess. The mechanical lock 91 is a locking hook. With the aid of the locking hook 91, the battery assembly 70, in particular the battery housing 21, can be connected to a motor scooter 10.

In the bottom section 75 of the battery housing 21 there is a guide device 85, in particular a slide-type guide device 85, which can be pushed or slid onto a guide device 210 of the motor scooter 10, in particular a rail-type guide device (see FIG. 6).

The guide device 85 of battery housing 21 preferably converges into locking plates 140. The locking plates 140 are guided or pushed on the guide device 210 of the unit 10 to be supplied.

The motor scooter 10 (see FIG. 6) preferably has a centring aid 220. The centring aid 220, for example, can be designed as a V-shaped part so that the locking plates 140 are guided along this shaped part 220 in order to be subsequently guided into locking recesses 230. The V-shape of the centring aid 220 is designed on the motor scooter 10 in such a way that the apex of the V is directed against the direction of travel F or in the direction of the rear end of the rear frame part 11. Edges 141 of the locking plates 140 run along the edges 221 of the centring aid 220 when the battery assembly 70 is pushed onto the motor scooter 10.

FIG. 4b also shows a combined current/communication plug 95. With the help of such a plug 95, the motor scooter 10 can be supplied with power. Furthermore, such a combined current/communication plug 95 can be used to establish a communication transmission or communication connection between the battery module 70 and the motor scooter 10. The combined current/communication plug 95 preferably has a bus interface.

The combined current/communication plug 95 is formed in the region of the bottom section 75 on a side section 73 of the battery housing 21. The pins of the current/communication plug are preferably designed perpendicular to the bottom section 75. The connection of the current/communication plug 95 to a current/communication socket 300 of the motor scooter 10 (see FIG. 6) can accordingly be effected by pushing the plug 95 onto the socket 300.

In connection with FIGS. 4b and 6 it also becomes clear that several locking recesses 160 can be formed in the battery housing 21, in particular in the bottom section 75. These locking recesses 160 are used to latch/receive locking recesses 310 (see FIG. 6) of the frame part 11 of the motor scooter 10. Furthermore, recesses 315 can be formed on the motor scooter 10, into which the rollers 130 of the battery assembly 70 can slide.

In an exemplary embodiment, a compartment 150 is formed on the rear section of the battery housing 21. This compartment 150 is formed to be closable and/or lockable in an exemplary embodiment. Access to compartment 150 can be gained by folding down or lifting off an appropriately closable and/or lockable battery housing section or lid 151. Preferably, a/the locking/actuating element, in particular a/the cord or a/the chain and/or a/the strap and/or a/the loop (not shown), is arranged in the compartment. The mechanical lock 91, in particular a locking hook, can be actuated by means of a cord or a chain or by means of a strap or a loop.

In FIG. 4c it can be seen that handle 80 is designed as a bow-type handle. The handle 80 has a gripping section 89, wherein the gripping section 89 converges into two rod-like or rail-like extension sections 135. These extension sections 135 are pulled out of the battery housing 21 in the illustrated state.

In the illustrated state of use, corresponding to the state of battery assembly 70 detached from the motor scooter 10, the extension sections 135 are pulled out of housing 21 in such a way that the actuating element 80 is in a partially pulled-out state, in particular in a partially telescoped state. The battery assembly 70 can be easily transported with the aid of the rollers 130.

In FIG. 5, the components in the battery housing 21 are shown in a partially transparent view (the battery housing sections are not shown here).

It can be seen that the handle 80 is designed as a bow-type handle. The handle 80 has a gripping section 89, wherein the gripping section 89 converges into two rod-like or rail-like extension sections 135. These extension sections 135 are mounted in an extensible manner, in particular telescopic, in the battery housing 21.

In a first state of use, corresponding to the driving state of an electric motor scooter 10, the extension sections 135 are preferably mounted completely in the battery housing 21.

Extension sections 135 can be mounted in guide rails 136.

A loudspeaker 185 is installed in the battery housing 21. The loudspeaker 185 is preferably a resonant loudspeaker. Advantageously, a section of the battery housing 21, especially the front section 71, can be designed as a resonance surface. The speaker 185 is installed between the battery 90 and a section, especially the front section 71, of the battery housing 21.

FIG. 6 shows a rear frame part 11 of a motor scooter 10. The functionality of the centring aid 220, the socket 300 and the shaped locking parts 310 has already been described above.

A part of the mechanical lock 91, which allows the battery assembly 70 to be locked with the motor scooter 10, can also be seen. A hook of the battery assembly 70 can engage into the illustrated bracket of the lock 91, so that mechanical locking is possible. By operating a cord/chain/strap/loop, the hook of the battery assembly 70 can be released from the bracket so that the mechanical lock can be released.

FIG. 7 shows the overall view of a motor scooter or motor scooter 10 according to the invention. The motor scooter 10 has a body on which a front wheel 12 and a rear wheel 12' are rotatably mounted. Furthermore, the body comprises a steering device 30, which enables the motor scooter 10 to be steered. The front wheel 12 is located at the lower end of the steering device 30. In the rear part, in particular on the rear frame part 11, there is a battery housing 21. A saddle 20, which is arranged or formed above the battery housing 21, can also be seen.

The motor scooter 10 shown is driven by an electric motor whose power source is located inside the battery housing 21. The battery housing 21 is detachably anchored within a holding frame 56 arranged between saddle 20 and rear frame part 11. The battery housing 21 or the battery assembly 70 can therefore be removed from the holding frame 56.

The upper part of the steering unit 30 is T-shaped. A display 100 is formed centrally in this upper region of the steering device 30.

FIGS. 8a to 8c show the battery assembly 70. The battery housing 21 comprises a front plate 71', a rear plate 72', two side plates 73' connecting the front and rear plates 71' and 72', a cover plate 74' and a bottom section 75. Also shown is an actuating element 80, which is designed in form of a handle. The handle 80 is arranged transversely with respect to the direction of travel F in the state installed in the motor scooter 10. The actuating element 80 is in particular pretensioned with a spring.

In order to allow the actuator 80 to be gripped around, the battery housing 21 has an engagement recess 81 in the region of the actuator 80, namely in the transition region 76 from the front plate 71' to the cover plate 74'. This engagement recess 81 is designed in such a way that the actuating element 80 can be completely gripped by hand.

The battery assembly 70 has passive cooling in the form of a cooling rib plate 82. This cooling rib plate 82 is formed on the rear plate 72' of the battery housing 21. A mains socket 83 is also provided on the rear plate 72'. The mains socket 83 is covered in the illustrated views so that the mains socket 83 is not soiled. A mains plug can be inserted into this mains socket 83 so that the battery 90 in battery housing 21 can be charged.

The battery housing 21 also has a slide-like guide device 85. The slide-like guide device 85 is designed in the bottom section 75. The lateral slide jaws 86 and the bearing surfaces 87 can be seen, meaning that the slide-like guide device 85 consists of two slide jaws 86 and two bearing surfaces 87. It is conceivable for the bearing surfaces 87 to be formed in an upwardly bent manner in the direction of the front plate 71'.

The illustrated slide-like guide device 85 can be pushed onto a rail-like guide device of the motor scooter 10. The rail-like guide device (not shown) thus forms the counterpart to the slide-like guide device 85. If the bearing surfaces 87 of the slide-like guide device 85 are formed in a curved manner, the bearing surfaces of the rail-like guide device of the motor scooter 10 are also formed in a curved manner. The surfaces 88 of the bottom section 75 of the battery housing 21 on the front plate serve as stop surfaces. The surfaces 88 regulate the maximum possible degree of displacement of the battery housing 21 on the rail-like guide device of the motor scooter 10.

The battery assembly 70 further includes a combined current/communication plug 95. This combined current/communication plug 95 is designed in the bottom section 75 of battery housing 21. In the illustrated embodiment, the combined current/communication plug 95 is located at the end of the slide-like guide device 85 on the front plate side or at the end facing the front plate 71'. The combined current/communication plug 95 thus serves, on the one hand, for electrically connecting the battery assembly 70 to the motor scooter 10. On the other hand, data of the battery assembly 70 can be transmitted to the motor scooter 10. It is possible that information or data such as the battery temperature and/or the charge state of the battery 90 and/or other necessary data regarding the battery 90 or the battery assembly 70 can be sent to the display unit 100.

If battery assembly 70 is connected to the motor scooter 10 and is to be replaced or charged, a mechanical lock 91 (see FIG. 8c) can be released by actuating the actuating element 80. At the same time, the circuit formed in the battery housing 21 is interrupted. In the illustrated embodiment of the invention, two locking bolts form the mechanical lock 91. By pulling up in pulling direction Z of the actuating element 80, the illustrated locking bolts are also pulled in pulling direction Z.

Two locking counterparts (not shown) of the motor scooter 10 located in the recesses 92 of the battery housing 21 (see FIG. 8c) are unlocked due to the pulling up of the locking bolts. After this pulling up and unlocking of the mechanical lock 91, the battery housing 21 can be moved or pushed in the direction of travel F on the rail-like guide device of the motor scooter 10 by means of the slide-like guide device 85. The battery housing 21 is thus detachable from the holder frame 56 in the direction of travel F.

Due to the actuation or pulling of the actuating element 80, a contact switch located inside the battery housing is further actuated, which interrupts the circuit of the battery assembly 70. After complete removal of the battery housing 21 from the motor scooter 10 and release of the actuating element 80, the contact switch can be designed in such a way that the circuit is closed again due to the release of the actuating element 80.

Due to the interruption of the current circuit, the current/communication connection, which is formed by the current/communication plug 95 of the battery assembly and a current/communication socket of the motor scooter 10, is de-energized. Accordingly, when the battery housing 21 is displaced, no current flows from the current/communication socket on the rail-like guide device and when the current/communication plug 95 is released correspondingly.

For example, battery assembly 70 has an emergency stop button 99, which is formed, for example, on the front plate 71'.

In FIG. 9 the components located in the battery housing 21 are shown in a partially transparent view. Battery 90 is designed as a rechargeable battery pack. Furthermore, the cooling rib plate 82 can be seen on the rear plate 72'. The battery housing 21 also contains a charger 96, a battery control unit 97 and a DC-DC converter 98.

FIG. 10 shows a section of a seat assembly 70 or a battery assembly 70 in a perspective view. Seat assembly 70 has a saddle 20, which is located on the top of seat assembly 70 and is detachably connected to a frame 21. In the exemplary embodiment shown, frame 21 covers the housing of the seat assembly. Furthermore, the seat assembly 70 has a drawer 152, which is arranged in a compartment 150' within the seat assembly 70. Drawer 152 is located to be extensible in the compartment 150'. An opening 153 is provided at the end of drawer 152 facing away from the handlebar, through which the locking actuation element (not shown) passes. For example, a loop may be provided that runs through opening 153 and is connected to mechanical lock 91, so that the mechanical lock 91 is released by pulling the loop.

In the exemplary embodiment shown, drawer 152 is secured against being pulled out by a lock 154 in the closed position. For example, lock 154 could be a lock 154 comprising a locking cylinder with a locking nose, wherein the locking nose engages in a groove of drawer 152 to secure drawer 152 against being pulled out. In another exemplary embodiment, lock 154 can also be designed as a lever lock.

By pulling out drawer 152, a securing element (not shown) is actuated. The securing element is moved from an anchoring position to a release position by the pull-out. By actuating the securing element, the connection of the saddle 20 with the frame 21 is released so that the saddle 20 can be removed or assembled. After a new saddle 20 is placed on the frame 21, the securing element is actuated by closing drawer 152 and a secure connection of the new saddle 20 with the frame 21 is established.

In an exemplary embodiment, the securing element is moved by means of a groove or an eyelet attached to the frame and at least one pin arranged on drawer 152. When drawer 152 is in the closed position, the pin engages the eyelet or the groove on the frame so that the saddle 20 cannot be lifted. By pulling out drawer 152, the pin is pulled out of the eyelet or groove so that the saddle 20 is free and can be replaced.

In another exemplary embodiment, the securing element can be actuated when drawer 152 is extended. For example, a lever may be located inside drawer 152, so that the motorcyclist of motor scooter 10 can release the saddle 20 by manually actuating the lever.

In an exemplary embodiment, the saddle 20 is pretensioned by a spring or a similar element relative to the frame 21. This will push the saddle 20 away from the frame 21 as soon as the saddle 20 is not connected to the frame 21. This gives the motorcyclist visual and tactile feedback that the saddle 20 is removable to prevent accidental release of the saddle 20.

In a preferred exemplary embodiment, the saddle 20 is latched onto the frame 21, e.g. by means of a snap lock, and pretensioned by a spring. When the saddle 20 is released by actuating the securing element, the latch is released and the saddle 20 is visibly released for the motorcyclist. Since a latching mechanism is provided, the saddle 20 and frame 21 can be re-latched by pressure from above, i.e. from one direction at least substantially orthogonal to the seat plane. The illustrated embodiment ensures that the saddle 20 is always connected to frame 21 when a motorcyclist sits on saddle 20. This increases safety for the motorcyclist.

FIG. 11 shows a motor scooter 10 in which the saddle 20 is released and in which drawer 152 is closed by the illustrated lock 154. In the illustrated exemplary embodiment, the saddle 20 can be latched onto frame 21 by placing it on the cover section 74, even if the drawer 152 is closed.

At this point it should be noted that all the parts described above are considered to be essential to the invention in each combination, in particular the details shown in the drawings. Modifications of this are generally known to the person skilled in the art.

LIST OF REFERENCE NUMERALS

10 Motor scooter
11 Rear frame part
12 Front wheel
12' Rear wheel
20 Saddle
21 Battery housing
30 Steering device
56 Holder frame
70 Battery assembly, seat assembly
71 Front section
71' Front plate
72 Rear section
72' Rear plate
73 Side section
73' Side plate
74 Cover section
74' Cover plate
75 Bottom section
76 Transition region
80 Actuating element
81 Engagement recess
82 Cooling rib plate
83 Mains socket
85 Slide-like guide device
86 Slide jaw
87 Bearing surface
88 Stop surface
89 Gripping section
90 Battery
91 Mechanical lock
92 Battery housing recess
95 Combined current/communication plug
96 Charging unit
97 Battery control unit
98 DC-DC converter
99 Emergency stop button
100 Display unit
130 Roller
135 Extension section
136 Guide rail
140 Locking plate
141 Edge of locking plate
150, 150' Compartment
151 Cover
152 Drawer
153 Drawer opening
154 Lock
160 Locking recess
180 Cross-sectional profile
185 Loudspeaker
190 Depression
210 Guide device of motor scooter
220 Centring aid
221 Edge of centring aid
230 Locking recess
300 Combined current/communication socket
310 Shaped locking part
315 Recess
F Direction of travel
Z Pulling direction

The invention claimed is:
1. Seat assembly, for a motor vehicle, comprising:
a frame comprising a housing;
a saddle arranged on the frame and detachably connected to the frame by a securing element; and
a compartment having a drawer arranged extendible within the compartment,
wherein:
the securing element is adapted to:
release the saddle in a release position; and
secure the saddle in an anchoring position, and
wherein the securing element is arranged and adapted such that the securing element is actuated or released when the drawer is pulled out.
2. Seat assembly according to claim 1,
wherein the securing element comprises a pin and a groove, wherein the groove is firmly connected to the saddle and the pin is firmly connected to the drawer, wherein the pin engages in the groove in an inserted position of the drawer such that the saddle is secured against removal.
3. Seat assembly according to claim 1,
wherein the securing element is designed as a snap lock.
4. Seat assembly according to claim 1,
including a spring element, wherein the spring element is arranged and formed such that the saddle is pretensioned against the frame by means of the spring element when the saddle is secured.
5. Seat assembly according to claim 1,
wherein the saddle has a recess and the drawer has a locking cylinder with a locking nose, wherein the locking nose is adapted to engage into the recess in a locked position of the locking cylinder when the drawer is in an inserted position.

6. Battery assembly for an electrically drivable motor vehicle, comprising:
   at least one battery;
   at least one releasable mechanical lock for connecting the battery assembly to the motor vehicle;
   a drawer arranged in a compartment, wherein the drawer is preferably lockable or closable in the compartment; wherein
   the mechanical lock can be actuated by a locking actuating element arranged in the drawer.

7. Battery assembly according to claim 6,
   wherein the battery housing comprises a front section, a rear section, two side sections connecting the front and rear sections, a cover section and a bottom section, wherein the battery housing has a guide device, which can be pushed or is slidable onto a guide device of the motor vehicle.

8. Battery assembly according to claim 7,
   wherein the guide device is a slide-like guide device is formed in the bottom section.

9. Battery assembly according to claim 6, including
   a combined current/communication plug.

10. Battery assembly according to claim 7,
    including a mechanical lock which formed in the bottom section of the battery housing.

11. Battery assembly according to claim 6,
    wherein the locking actuating element is formed as a cord or a chain or a strap or a loop.

12. Battery assembly according claim 6,
    wherein the locking actuating element is arranged and adapted such that the locking actuating element is accessible or actuable in an extended position of the drawer.

13. Battery assembly according to claim 6,
    including at least one mains socket for charging the at least one battery or by at least one Bluetooth interface and/or by at least one USB socket.

14. Battery assembly according to claim 7,
    including a saddle is formed on the battery housing for providing a seat assembly
    having a frame comprising a housing, a saddle arranged on the frame and detachably connected to the frame by a securing element; and
    a compartment having a drawer arranged extendible within the compartment, wherein,
    the securing element is adapted to:
       release the saddle in a release position; and
       secure the saddle in an anchoring position, and
    wherein the securing element is arranged and adapted such that the securing element is actuated or released when the drawer is pulled out.

15. Battery assembly according to claim 14,
    wherein the saddle has a substantially V-shaped or U-shaped cross-sectional profile.

16. Electrically drivable motor vehicle, comprising:
    at least one battery assembly, having;
       a battery;
       at least one releasable mechanical lock for connecting the battery assembly to the motor vehicle; and
       a drawer arranged in a compartment, wherein the drawer is preferably lockable or closable in the compartment; and
    wherein the mechanical lock can be actuated by a locking actuating element arranged in the drawer.

17. Electrically drivable motor vehicle according to claim 16,
    wherein the battery assembly is secured to a rear frame part of the motor scooter by means of a releasable mechanical lock.

18. Electrically drivable motor vehicle according to claim 16,
    including a guide device, wherein a battery housing can be pushed against the direction of travel (F) by the guide device (210) of the motor vehicle after a mechanical lock of the battery assembly has been released by means of a guide device of the battery assembly.

19. Electrically drivable motor vehicle according to claim 17
    including a locking counterpart adapted to cooperate with the mechanical lock.

20. Method for assembling a motor vehicle including a seat assembly having a frame, a saddle arranged on the frame and detachably connected to the frame by a securing element, and a compartment having a drawer arranged extendible within the compartment, wherein the securing element is adapted to release the saddle in a release position and secure the saddle in an anchoring position, wherein the securing element is arranged and adapted such that the securing element is actuated or released when the drawer is pulled out and wherein the securing element detachably connects a saddle in a securing position to a frame, comprising:
    transferring the securing element from an anchoring position to a release position to release the saddle;
    loosening the saddle;
    inserting a second saddle; and
    transferring of the securing element from the release position to the anchoring position to secure the saddle.

* * * * *